United States Patent [19]
Richards

[11] 3,901,325
[45] Aug. 26, 1975

[54] CULTIVATOR HAVING A FLOATING PLANT GUARD

[76] Inventor: Harold W. Richards, P.O. Box 4, Rantoul, Kans. 66079

[22] Filed: Oct. 7, 1974

[21] Appl. No.: 512,740

[52] U.S. Cl. .................. 172/81; 172/517; 172/108; 172/112
[51] Int. Cl. ...................... A01b 33/16; A01b 39/26
[58] Field of Search ........ 172/81, 77, 112, 517, 509, 172/302, 108

[56] References Cited
UNITED STATES PATENTS

| | | | |
|---|---|---|---|
| 1,197,557 | 9/1916 | Slechta | 172/509 |
| 1,414,191 | 4/1922 | Kosmalski | 172/517 X |
| 2,214,702 | 9/1940 | Seaman | 172/77 X |
| 3,078,929 | 2/1963 | Kruse | 172/302 |
| 3,136,373 | 6/1964 | Bonomo et al. | 172/77 X |

*Primary Examiner*—George J. Marlo
*Attorney, Agent, or Firm*—Fishburn, Gold & Litman

[57] ABSTRACT

A cultivator for tilling soil by means of attached soil disrupting members and having the improvement of a floating plant guard which comprises planar plant shield plates located toward each side of the cultivator and outside the soil disrupting members. The front ends of the shield plates are upwardly pivotable whereas the rear ends are downwardly pivotable. The rear ends of the plates are urged continuously downward against the ground by means of springs or the like, hence causing the front ends to ride lightly and floatingly over the ground as the cultivator is moved over a path to be tilled.

12 Claims, 4 Drawing Figures

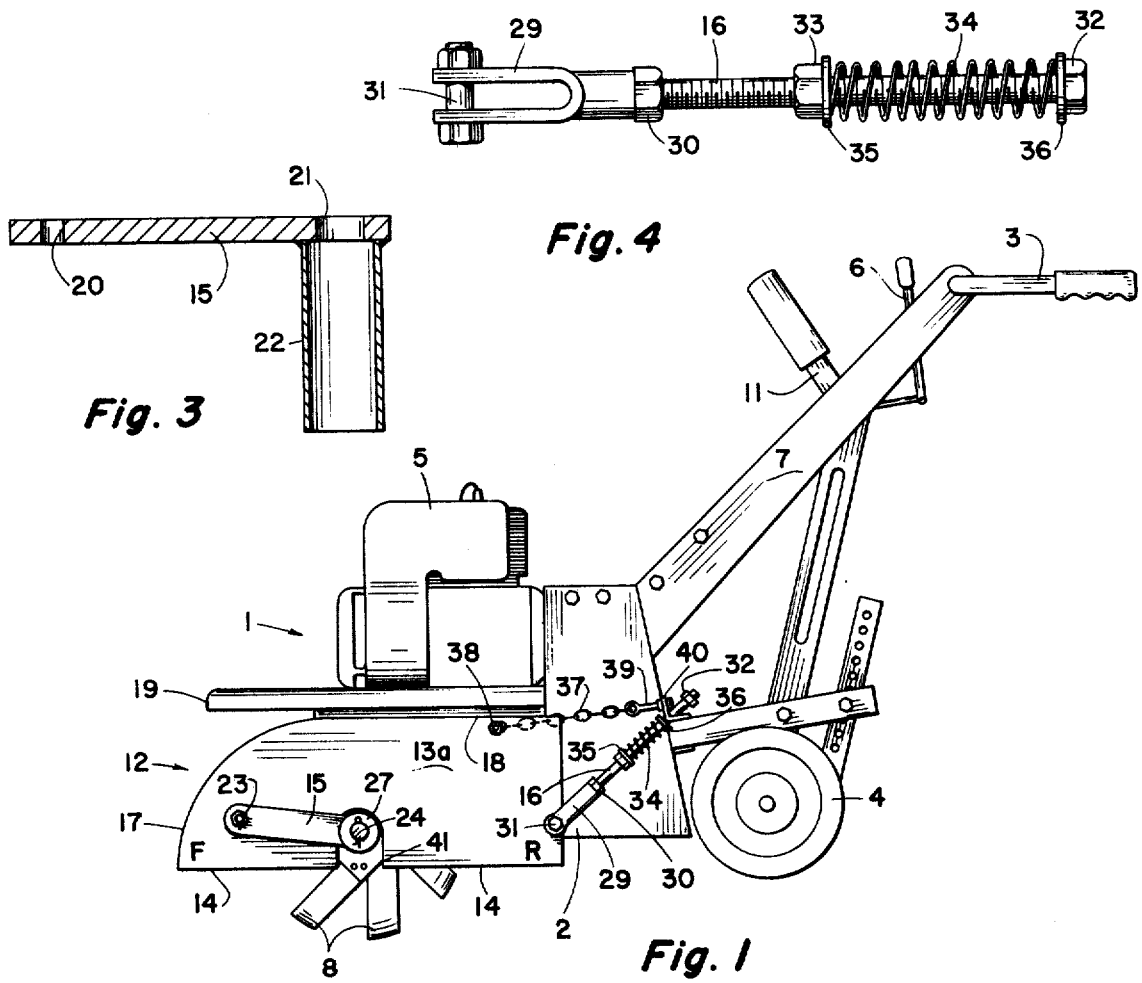
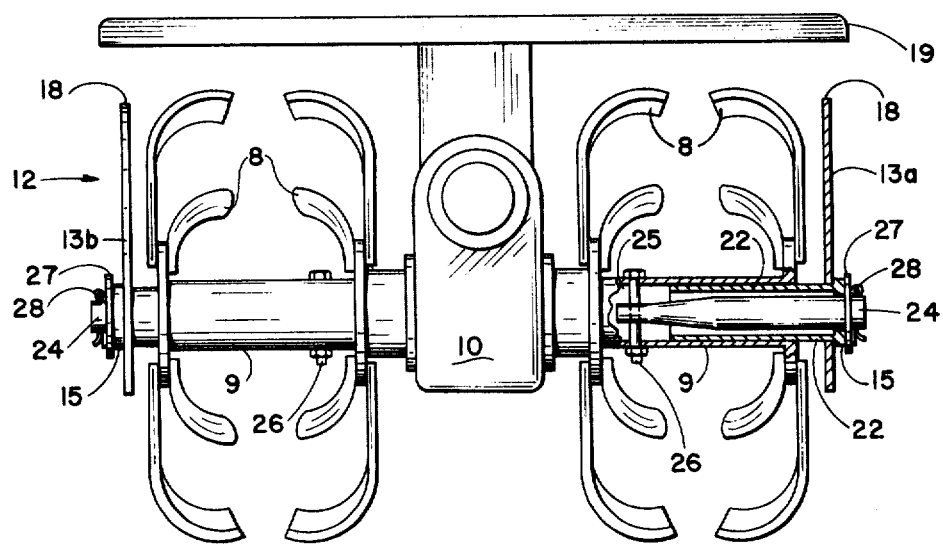

CULTIVATOR HAVING A FLOATING PLANT GUARD

BACKGROUND OF THE INVENTION

The present invention pertains to machines for cultivating the soil and more particularly to a floating guard for protecting plants from damage when using a cultivator in the vicinity thereof. In one specific respect, the present invention pertains to a floating plant guard which can be used to advantage with rotary garden tillers.

In the use of soil cultivating means which have attached soil disrupting members for tilling the soil, it is known that guards, or shields, can be attached toward each side of the cultivator and outside of the soil disrupting members in order to prevent damage to proximal plants. Stems and foliage of the plants are thus prevented from entanglement with the soil disrupting members and from being struck or covered by erupted soil which is thrown to either side of the cultivator. U.S. Pat. Nos. 1,945,514; 2,048,201; 3,078,929 and 3,151,431 disclose cultivators having plant guards located outwardly of soil disrupting members in the form of rotating spikes, discs, rake wheels, cultivator hoes, etc. However, only Kruse in U.S. Pat. No. 3,078,929 makes mention of a shield floatingly supported from a cultivator frame, i.e. a shield which follows the contour of the ground and hence rides up and down as the cultivator moves over surface rises and depressions.

The reason for adapting cultivator plant guards to float is (1) to prevent the guards from dragging on the ground so that forward motion and the intended function of the cultivator is impeded when the soil erupting members are trying to bite into the ground to their fullest extent, and (2) to let the guards drop down and remain at ground level when the soil erupting members are not biting into the ground to the fullest extent. Whereas floating guards are a considerable improvement over those having a fixed height setting, they nonetheless suffer from the drawback of limited "float" capability in that the front lower corners of the shields have a tendency to dig into the ground, thus damaging the shields or impeding the forward movement of the cultivator. It has been observed that this problem is particularly serious when attempting to adapt a floating plant shield to a rotary garden tiller, for these devices are limited in pulling power to an extent that the tendency for the front ends of the plant guards to dig into the ground could not be easily overcome heretofore.

Therefore, an object of the present invention is to provide a cultivator having an improved plant guard.

Another object is to provide an improved floating plant guard for cultivators whereby the tendency for the guard members to dig into the earth and thus hinder the cultivating operation is substantially avoided.

Still another object is to provide a floating plant guard for a rotary garden tiller.

Other objects and advantages of the present invention will become apparent from the following description and the appended claims.

SUMMARY OF THE INVENTION

The present invention is an improvement in cultivators of the general type having a frame with wheels thereon whereby the cultivator rolls along the ground over a path to be cultivated, and which has attached soil disrupting members for tilling the soil as the cultivator moves along the path.

In accordance with this invention, a floating plant guard for cultivators is provided wherein the guard comprises floating shield plates located toward each side of the cultivator and on the outside of the soil disrupting members. The entirety of each floating shield plate is adapted for floating up-and-down movement. In addition, however, the front ends of the shield plates are upwardly pivotable and the rear ends thereof are downwardly pivotable. Means are also included for urging the rear end of each shield plate downward against the ground when the cultivator moves along the path to be cultivated, hence causing the front ends of the shield plates to ride lightly and floatingly over the ground and thus reducing the tendency of the plates to dig into the earth and thereby impede movement and function of the cultivator.

BRIEF DESCRIPTION OF THE DRAWINGS

FIG. 1 is a side view of a rotary garden tiller having the improved floating guard of the present invention attached thereto.

FIG. 2 is a rear view of the rotary tiller and the attached floating plant guard of FIG. 1.

FIG. 3 is a top section view of a pivotal arm which can be used with the plant guard of FIGS. 1 and 2.

FIG. 4 shows details of a shield plate support rod and tensioned spring arrangement which can be used with the plant guard of FIGS. 1 and 2.

DESCRIPTIVE DETAILS OF THE INVENTION

In FIG. 1, a gasoline powered rotary garden tiller is generally represented at 1. The cultivator has a frame 2, a set of handle bars 3, and wheels 4 mounted on the frame so that the cultivator can roll over the ground along a path to be tilled. The gasoline motor 5 has a throttle lever 6 mounted on handle post 7. Tiller cutter blades 8, which are the soil disrupting members, are attached to a powered rotary shaft 9 which leads from the transmission 10. Engagement of the transmission is controlled by means of lever 11 whereby turning of the blades 8 is started and stopped.

The floating plant guard of the present invention is generally represented at 12. The guard has left and right floating planar shield plates, represented at 13a and 13b respectively, which are located on each side of the cultivator outside of the cutter blades 8. Since both of these shield plates and the associated parts are for all practical purposes identical in construction and function, further reference to parts may be in the plural even though only one such part may be visible in the drawings. The shield plates 13a and 13b have front and rear ends represented at F and R, respectively, and an elongated lower edge 14 for contact with the surface of the ground. As previously indicated, the front ends F of the floating shield plates are pivotable upward whereas the rear ends R are pivotable downward while means are employed for urging the rear end of each shield plate downward toward the ground. As shown in FIGS. 1 and 2, pivotal attachment of the shield plates and the downward urging thereof at the rear is achieved, respectively, by means of pivotal arms 15 and compressed springs 34 on the inclined rear support rods 16. Additional details will be given later on of the construction and function of the pivotal arms and the support rods with compressed springs. In addition, alternative means of pivoting and downwardly urging the shield plates will also be described.

Referring again to FIG. 1, it can be seen that the planar shield plates 13a and 13b extend forwardly and rearwardly of the tiller cutter blades 8, while also extending vertically at least to the height of the blades. Although shield plates having somewhat less length and height could be used, there is advantage in using the dimensions just indicated for maximum protection of plants in the vicinity of tilling operation. As can also be seen in FIG. 1, the shield plates can be provided with an arcuate front edge 17 which curves upwardly and rearwardly from the lower edge 14 of the plate to the upper edge 18. The purpose of this curved edge is to gently urge plant stems and leaves aside as the tiller moves forward, thus preventing their being cut by the blades 8.

The cultivator can also have a top cover 19 located over the cutter blades 8. As shown in FIGS. 1 and 2, the top cover extends forwardly and rearwardly of the blades 8 and from side to side to a distance about equal to the span between the shield plates 13a and 13b. It should be noted, however, that sufficient space is left between the top edge 18 of the plates and the top cover 19 to permit substantial upward floating of the plates without being impeded by the cover.

One manner in which the planar shield plates 13a and 13b can be pivotally mounted to the cultivator to achieve the aforesaid up and down pivoting of the front ends of the plates is by means of pivotal arms 15, a top sectional view of which is shown in FIG. 3. The arm 15 includes front and rear drilled holes 20 and 21, respectively, and a sleeve 22 attached to the arm in coaxial alignment with hole 21. The arms are attached to the plates by means of a threaded bolt 23 having an attached nut whereby the bolt passes through hole 22 and a corresponding hole in the plate, but without the nut being pulled up tightly enough to bind the arms against the plates. In accordance with FIGS. 1, 2 and 3, the power driven shaft 9 extends from side to side between the shield plates 13a and 13b, and the outer ends of the shaft extend beyond the plates. In addition, shaft 9 is hollow, and pieces of bar stock, which serve as shaft extensions 24, are inserted within the central openings 25 of the shaft at each end thereof and are secured to the body of the shaft by means of bolts and nuts 26.

The pivotal arms 15 are retained on the outer ends of the shaft extensions 24 by means of washers 27 held in place with Carter keys 28. The drilled holes 21 have a diameter slightly larger than the shaft extensions 24, thus the metal surfaces of the arms which surrounds the holes 21 serve as bearings against which the rotating shaft extensions 24 ride. More complex bearings such as ball bearings or roller bearings can be used, although such have not been found necessary.

It can thus be seen that arm 15 can pivot around shaft extensions 24 at one end, and around the bolts 23 which are used to attach the arms to the shield plates. It will also be appreciated that the arms 15 lend lateral stabilization to the shield plates at the front end. Alternatively, the rear of the pivotal arms could be attached to the cultivator frame instead of the shafts, or the bearing surface could be mounted on the shaft inside of the shield plates, or the pivotal arms could be dispensed with by attaching bolts 23 to a frame member of the cultivator and providing an arcuate slot in the shield plate for up and down movement of the front end thereof, thus permitting pivotal movement of the front of the plates while also providing lateral stabilization.

Anchor means is needed in conjunction with the pivotal arms 15 to restrain the front ends of the plates from excessive downward tipping by trying to rotate around the shaft extensions 24. In FIG. 1 the anchor means are chains 37 having their front links attached to the upper rear ends of the shield plates by means of bolts 38 while having their rear links attached to turnbuckles 39 which are in turn secured to the angle iron frame member 40. Turnbuckles 39 are tightened or loosened to adjust the elevation of the front ends F of the plates with respect to level positions. Rods could be used instead of chains as an anchor means, but in either case the anchor means should be pivotally attached to the upper rear ends of the shield plates while being pivotally attached at their other ends of the cultivator frame so that the rear ends of the shield plates can move up and down while at the same time being restrained from excess forward movement when the front ends of the shield plates tend to tip downwardly.

The rear ends R of the shield plates 13a and 13b can be continuously urged downward against the ground by various means such as tensioned springs which are attached to the plates at one end and to the cultivator frame at the other, and which either push or pull the plates downwardly. Alternatively, the plates can be urged downward by means of fluid pressure through use of a cylinder containing a piston with an attached actuating rod which is in operative contact with the plate.

One apparatus arrangement which can be used for supporting, stabilizing, and downwardly urging the rear ends of the shield plates is shown in FIGS. 1 and 4. In FIG. 4, a clevis 29 is screwed onto the threaded support rod 16 and there is a lock nut 30 for the clevis. Threaded bolt 31, having a matching nut, extends transversely through the clevis and provides a means for pivotably attaching the support rods to the lower rear ends of the shield plates. A nut 32 is screwed onto the upper end of the support rod whereas nut 33 is located on the support rod intermediate the upper nut 32 and lock nut 30. A helical spring 34 is spindled onto the support rod 16, and the upper and lower ends of the spring are abutted by washers 35 and 36, respectively.

As can be seen from FIG. 1, the rear support rods 16 are inclined upwardly, with the clevis 29 of the rod being pivotably attached to the rear end of the shield plates, at bolt 31, below the pivotal attachment of the anchor means to the plate at bolt 38. The upper end of each support rod passes upward through, and is also movable upward and downward through, an opening in the angle iron frame member 40. The upper nut 32 on the support rod 16 above the frame member 40 serves as a rod stop to limit downward movement of the rod and the rear end R of the shield plate attached thereto. The intermediate nut 33 on the rod is turned to adjust the extent to which the spring 34 is compressed against the lower washer 35, next to nut 33, and the upper washer 36 which abuts the unyielding frame member 40. As the degree of compression on the springs 34 is increased, the pressure at which rear ends of the plates are pressed against the ground is increased. Furthermore, as the spring compression is increased, there is an increasing tendency for downward pivoting of the rear ends of the plates and upward pivoting of the front ends. Accordingly, the compression of the springs can be adjusted to an extent where the rear ends of the plates are continuously urged downwardly while the front ends ride lightly and even more floatingly on the ground than the rear ends. It will be noted, therefore, that the entirety of both shield plates is capable of floating up and down even though the rear of the plates is biased downward to assist upward pivoting of the fronts. In addition, the shield plates can float up and down and pivot independently of one another. A cutout 41 in the shield plates around shaft 9 permits a desired degree of unrestrained up and down floating of the entire plate.

It will be appreciated that when the support rods 16 are used, it is not essential that springs 34 be spindled thereon for urging the rear ends of the plates downward against the ground. Where preferred, springs or other means for urging the plates can be used separately of the rods.

Prior to operating the rotary tiller shown in FIG. 1, the height of the lower edge 14 above level ground is set at a desired point by adjusting the anchor turnbuckle 39. Tightening the turnbuckles raises the plates, whereas loosening of the turnbuckles lowers the plates. When the desired elevation of the plates has been accomplished, it may then be necessary to adjust the tension of spring 34 by turning nut 33, thus achieving a tension which provides the desired degree of downward urging on the rear ends R of the shield plates.

While the invention has been described with reference to particular apparatus, parts, arrangements thereof, functions, and the like, it will nonetheless be understood that even other embodiments will become apparent which are within the spirit and scope of the invention defined in the following claims.

What is claimed is:

1. For use in combination with a cultivator having a frame with wheels thereon whereby the cultivator rolls along the ground over a path to be cultivated and also having attached soil disrupting members for tilling the soil as the cultivator moves along said path, a floating plant guard attachment comprises floating shield plates adapted for location toward each side of said cultivator on the outside of said soil disrupting members, said floating shield plates having an elongated lower edge for light contact with the ground, the front ends of said plates being upwardly pivotable with respect to said frame, and further including means associated with said frame for resiliently urging each of said plates in a direction pivoting said front ends upwardly as the cultivator moves along the path to be cultivated.

2. Apparatus as in claim 1 wherein said shield plates extend forwardly and rearwardly of the soil disrupting members and vertically from ground level to a height at least equal to that of said disrupting members.

3. Apparatus as in claim 1 wherein said means for resiliently urging said shield plates comprises a compressed helical spring.

4. Apparatus as in claim 1 wherein the cultivator is a rotary garden tiller having a powered drive shaft with rotary tiller blades attached thereto as the soil disrupting members, said shaft extending from side to side between said shield plates.

5. Apparatus as in claim 4 including cut-outs in said shields through which said shaft extends.

6. Apparatus as in claim 1 wherein said shield plates have an arcuate front edge which curves upwardly and rearwardly from said lower edge and which merges with an upper edge on said shield plates.

7. Apparatus as in claim 1 comprising:
   a. pivotal arms for each of said shield plates, one end of each arm being pivotally attached to a shield plate toward the front end of said plate and the other end of each arm being pivotally attached to the cultivator rearwardly from the arm attachment to the shield plate, and
   b. anchor means for each of said shield plates, one end of each of said anchor means being pivotally attached to the upper rear end of a shield plate and the other end thereof being pivotally attached to the cultivator frame.

8. Apparatus as in claim 7 and further including inclined rear support rods for each of said shield plates, the lower end of each of said support rods being pivotally attached to the rear end of a shield plate below the pivotal attachment of said anchor means thereto, the upper end of each of said support rods passing through and being movable upward and downward through an opening in a frame member of the cultivator, each support rod having an attached rod stop above said opening to limit downward movement of the rod and the rear end of the shield plate attached thereto.

9. Apparatus as in claim 8 wherein a helical spring is spindled onto each of said support rods and is compressed from the lower end by a spring stop on the rod and from the upper end by said frame member of the cultivator.

10. Apparatus as in claim 8 wherein said anchor means further includes means for adjusting the length thereof.

11. Apparatus as in claim 8 wherein the cultivator is a rotary garden tiller having a powered drive shaft with rotary tiller blades attached thereto as the soil disrupting members, said shaft extending from side to side between said shield plates, and wherein the attachment of said pivoted arms to said cultivator is by means of rotary bearings attached to said arms, said bearings being mounted on said shaft.

12. Apparatus as in claim 11 wherein the ends of said shaft extend beyond said shield plates and said rotary bearings are attached to the ends of the shaft outside of the shield plates.

* * * * *